(12) United States Patent
Bi et al.

(10) Patent No.: US 11,923,688 B1
(45) Date of Patent: Mar. 5, 2024

(54) ESTIMATION SYSTEM FOR AGGREGATED INERTIA IN A POWER SYSTEM

(71) Applicant: NORTH CHINA ELECTRIC POWER UNIVERSITY, Beijing (CN)

(72) Inventors: Tianshu Bi, Beijing (CN); Cheng Wang, Beijing (CN); Jiahao Liu, Beijing (CN); Guoyi Xu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/218,224

(22) Filed: Jul. 5, 2023

Related U.S. Application Data

(63) Continuation of application No. 18/116,685, filed on Mar. 2, 2023, now Pat. No. 11,777,321.

(51) Int. Cl.
*H02J 3/38* (2006.01)

(52) U.S. Cl.
CPC ........... *H02J 3/381* (2013.01); *H02J 2300/28* (2020.01)

(58) Field of Classification Search
CPC .............................. H02J 3/381; H02J 2300/28
See application file for complete search history.

(56) References Cited

U.S. PATENT DOCUMENTS 11,777,321 B1 * 10/2023 Bi ........................... H02J 3/381
290/44

* cited by examiner

*Primary Examiner* — Sean Gugger
(74) *Attorney, Agent, or Firm* — Hunton Andrews Kurth LLP

(57) ABSTRACT

An exemplary two-step method for power system inertia online estimation is described. The first step is to accurately estimate the POI-level aggregated inertia. The second step is to calculate the system-level inertia constant by weighting all the POI-level aggregated inertia and to monitor the inertia spatial distribution. In one example embodiment, the PMU is installed at POI, the frequency spatial difference is considered, and the mechanical power is carefully treated.

1 Claim, 10 Drawing Sheets

ESTIMATION SYSTEM FOR AGGREGATED INERTIA IN A POWER SYSTEM

BACKGROUND

Frequency reflects the active power real-time balancing in alternating-current power systems. In recent years, the strengths of active power disturbances caused by power system contingencies have continued to increase, considering the heavy loading conditions in tie lines and the construction of large offshore wind farms. Therefore, it becomes increasingly challenging to maintain the frequency within a certain range.

SUMMARY

Online estimation of power system inertia provides the essential basis for frequency stability analysis and control. The present disclosure relates to an approach to estimate the aggregated inertia at the point of interconnection (POI), which can be further used to calculate the power system's total inertia and to monitor the inertia spatial distribution. Based on the spatial correlation of the power system frequency, the general correlation between the rotor speed and network bus frequency is derived. Furthermore, the phasor measurement unit placement principle for inertia estimation is given, and the impacts of redundant and lacking frequency measurement are analyzed. The described method is designed for the field implementation scenario, where ambient measurement data are used and the requirement for mechanical power measurement is relaxed. Simulation results carried out on the modified IEEE 39-bus System show that the described approach can accurately estimate POI-level inertia under different conditions, including poor data quality, lacking POI frequency, parameter and topology error, and renewable power generation penetration.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
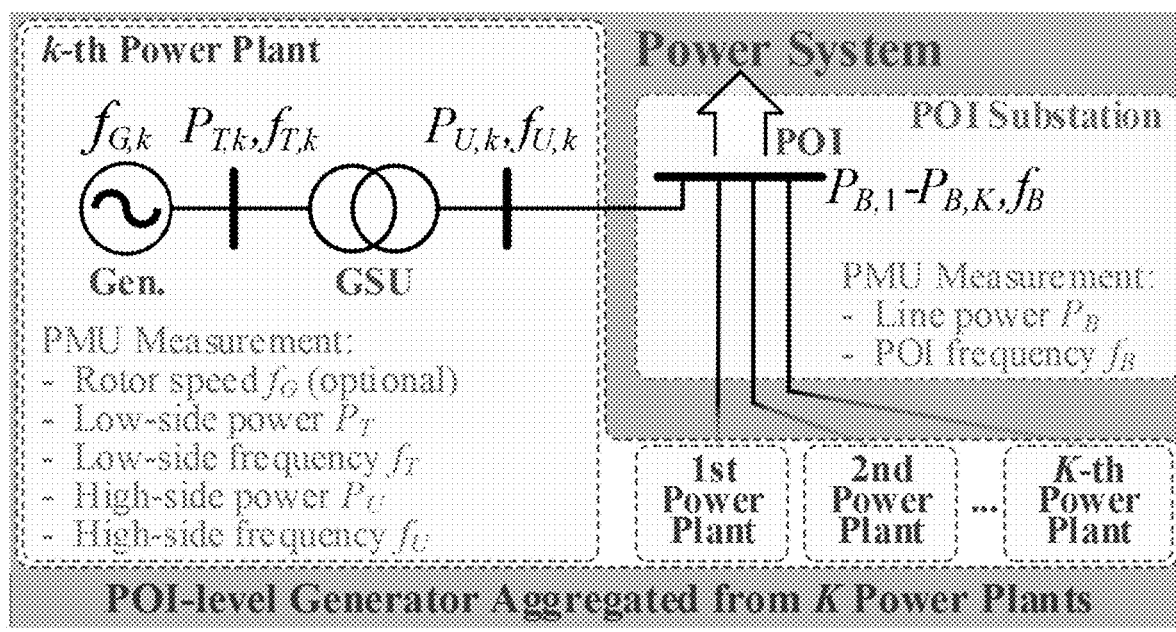
FIG. 1 shows an exemplary electrical layout schematic of a POI according to an exemplary embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention.

I. Introduction

Power system inertia is the aggregated feature of all the synchronous rotation components. It reflects the first-aid ability of mitigating frequency variation. With the increasing penetration level of renewable power generation (RPG), however, the power system inertia has been decreasing due to (i) the decrement of the in-operation share of synchronous generators among all types of generation assets; (ii) the natural weak or zero inertia feature of the RPG; and (iii) the unreliability and uncertainty of virtual inertia (VI) provided by the RPG even after implementing the VI control scheme. This lack of inertia would lead to an increase in the rate of change of frequency (RoCoF) after active power disturbances, which may not only enlarge the maximum frequency deviation but also trigger the RoCoF protection of generators and further jeopardize the frequency index. Thus, it is crucial to monitor the power system inertia for the sake of frequency security.

In practice, the VI provided by the RPG is less frequently functional, especially in small-disturbance episodes, considering the frequency dead-band setting due to the noise susceptibility of frequency and RoCoF measurements. Although the VI would be more practical or even become the major provider for system inertia in the future, most of the system inertia is offered by synchronous generators at this stage, which can be described by the inertia constant. The total inertia of the power system is the weighted sum of the inertia constants of all the synchronous generators in operation.

It seems that the system-level aggregated inertia would be available under a fixed dispatch strategy, where the generator inertia constants can be accessed from the simulation database and their operating status is available from the SCADA system. However, the dispatch-based method has many disadvantages. First, the generator inertia constant may be inaccurate. On the one hand, the inertia of the prime mover and the rotating exciter may not be considered in the inertia constant provided by the equipment manufacturer, and the inertia of the rotating exciter may have changed due to its aging and replacement. On the other hand, the inertia constant obtained by the offline load rejection experiment may be inaccurate as the number of tests is limited, and some small generators may not meet the capacity requirements of the experiment, which indicates that their contribution to the system-level inertia may be neglected. In addition, although the operation status of most generators is available by monitoring the circuit breaker (CB) status in SCADA, there is an inherent time delay in the SCADA system. Meanwhile, the CB status of some small generators may not be monitored.

The wide deployment of phasor measurement units (PMUs), which can offer accurate real-time measurements for power system state variables, has provided another avenue for the real-time inertia estimation problem. The event-driven inertia estimation method based on the frequency data measured by PMUs is proposed in the literature. The generator trip or load rejection events need to be monitored first. According to the values of unbalanced active power and RoCoF after the disturbance, the system inertia can be calculated. This method cannot meet the online estimation requirement or reflect the spatial distribution characteristic of system inertia.

tors to be estimated. In addition, the above two schemes require each generator to be equipped with a PMU.

(3) The POI: As the POIs are the jurisdictional boundaries between the power plants and the grid operator, it is possible to monitor multiple power plants with one PMU. However, the electrical frequency at the POI differs even more from the rotor speed of generators, as there are transmission lines and a transformer in between. The generator inertia could still be estimated if the complex dynamic model of the transmission lines is considered, which would significantly increase the computational burden. Recently, the online inertia estimation scheme based on Frequency Divider has been proposed, which can calculate the rotor speed of a generator using the frequencies of its POI and sub-POIs (that is, the buses adjacent to the POI). To estimate the total

TABLE I

The factors to be considered when evaluating the inertia estimation method

| | Factors* | Ref. 1 | Ref. 2 | Ref. 3 | This disclosure |
|---|---|---|---|---|---|
| Properties of method | PMU installation location | Low side of the GSU | High side of the GSU | High side of the GSU | POI |
| | Frequency spatial difference | Not considered | Not considered | Not considered | Considered |
| | Treatment of mechanical power | Equal to electromagnetic power | Equal to electromagnetic power | Equal to electromagnetic power | Not equal to electromagnetic power |
| | Parameter identification | Ratio of power to RoCoF | ESPRIT-DFT-based identification | ARMAX-based identification | Continuous-time system identification |
| | Bus frequency calculation | Embedded in software | Not available in [23] | Embedded in software | Embedded in software |
| | Additional probe signal | Not required | Not required | Not required | Not required |
| Condition settings in verification | Type of disturbance | Load step and generator trip | Short-circuit | Generator trip | Load ambient change |
| | RPG penetration | None | None | None | None |
| | Noise level | None | White noise | None | None |

*Any of these factors will affect the accuracy of inertia estimation results.

Recently developed approaches have adopted the PMU near the generator to monitor the inertia of each generator or power plant in an online fashion. The literature review was conducted according to measured data locations recommended by NERC, which are the low side of the generator step-up (GSU) transformer (that is, terminal of the generator), the high side of the GSU, and the POI.

(1) The low side of the GSU: In some of the references in this area, the measured active power and frequency at the low side of the GSU are adopted to estimate the generator inertia after large disturbances. Similarly, in one reference, rotor speed/frequency and active power at the low side are employed for inertia estimation. One major theoretical basis of those works is the generator swing equation, which requires the rotor speed to be known. In this regard, the PMU should be placed close enough to the generator, and generator speed measurement is required, which is not realistic for PMU field implementation.

(2) The high side of the GSU: In one reference, the frequency and active power data at the high side of the GSU are used for inertia estimation. However, the power system frequency has spatial distribution characteristics, which depends on the electrical di stance between buses. Considering the transformer reactance, which would enlarge the electrical distance, the electrical frequency at the high side of the GSU is not equal to the frequency at the generator terminal. The inertia estimation results are credible only when the disturbance location is far away from the generasystem inertia, the number of PMUs that need to be placed is approximately twice the number of POIs.

It should be emphasized that all the aforementioned PMU-based methods share the common assumption that the mechanical power equals the electromagnetic power before the active power disturbance. The reason is that the mechanical power cannot be measured by the PMU, especially the PMU at POI. This assumption indicates that there is no active power imbalance before the disturbance and that the frequency remains unchanged. This assumption is only acceptable in large disturbance scenarios, as the relatively small ambient frequency fluctuations can be neglected, which is not suitable for the time-driven inertia estimation framework.

In this disclosure, a two-step method for power system inertia online estimation is described. The first step is to accurately estimate the POI-level aggregated inertia. The second step is to calculate the system-level inertia constant by weighting all the POI-level aggregated inertia and to monitor the inertia spatial distribution. Many factors should be considered when evaluating the inertia estimation method, such as the properties of method and the conditions settings in verification, as shown in Table I. In one example embodiment, the PMU is installed at POI, the frequency spatial difference is considered, and the mechanical power is carefully treated. Accordingly, an exemplary embodiment of the present disclosure can provide at least the following benefits:

(1) The general correlation between generator rotor speed and network bus frequency is derived, which can calculate the rotor speed with minimum online measurement.

(2) The impacts of redundant and lacking frequency measurements on the proposed method are analyzed, and a weighted least squares-based approach is described.

(3) The described method could be applied in small disturbance scenarios and measurement of the mechanical power is not required.

II. Problem Formulation

A. PMU-Based Power System Inertia Estimation

The frequency dynamics of power systems is related to the rotor speed dynamics of synchronous generators, and the rotor speed dynamics of a synchronous generator can be described by the swing equation as follows:

$$2Hpf_G(t)=P_m(t)-P_T(t), \quad (1)$$

where $p=d(\cdot)/dt$ is the differential operator; H is the inertia constant of the generator; $f_G$ is the rotor speed; $P_m$ is the mechanical power provided by the prime mover; and $P_T$ is the electromagnetic power across the air gap and is approximately equal to the active power at the terminal.

With the frequency and the active power provided by the PMU, the inertia constant of the online generator can be obtained from the parameter identification problem formulated by eq. (1).

B. The Role of POI-Level PMU Measurements

Depending on the PMU installation location, PMUs can be divided into power-plant PMUs and substation PMUs. FIG. 1 shows an exemplary electrical layout schematic of a POI according to an exemplary embodiment of the present disclosure. FIG. 1 shows K power plants connecting to one POI substation via transmission lines, where the PMU locations and their measured signals are also shown.

With the power plant PMU, the inertia constant of a single generator can be estimated. Similar to eq. (1), the generator dynamic model in the k-th power plant can be expressed as $$2H_k p f_{G,k}(t)=P_{m,k}(t)-P_{T,k}(t), \quad (2)$$

where the terminal frequency $f_{T,k}$ ($f_{T,k} \approx f_{G,k}$) and the active power $P_{T,k}$ can be measured and used for parameter identification. The frequency $f_{U,k}$ and active power $P_{U,k}$ measured at the high side of the GSU can also be used, considering $P_{U,k} \approx P_{T,K}$ and $f_{U,k} \approx f_{G,k}$.

From the perspective of a POI substation, the aggregated dynamics of K connected power plants can be described by the aggregated swing equation $$2H_{ag} p f_{G,ag}(t) = \sum_k P_{m,k}(t) - \sum_k P_{T,k}(t), \quad (3)$$

where $f_{G,ag}$ is the equivalent rotor speed, which equals the rotor speed of each generator due to coherency, e.g., $f_{G,k}$; $H_{ag}$ is the total inertia of K power plants (that is, POI-level aggregated inertia); and $\Sigma_k P_{T,k}$ is the sum of the terminal active power of all generators. With the frequency $f_B$ and the total incoming active power $\Sigma_k P_{B,k}$ measured by the POI substation PMU, the POI-level aggregated inertia can be roughly estimated.

As shown in FIG. 1, the K power-plant PMUs can be replaced by one POI substation PMU if only the POI-level measurement is considered, which can significantly reduce the number of installed PMUs. Moreover, since the generators connected to the same POI are usually coherent, the spatial resolution of POI-level inertia is high enough to depict the spatial distribution of the system inertia. Therefore, it is practical to estimate the POI-level inertia with the POI substation PMU.

C. Challenges in Online Estimation of the POI-Level Inertia

Figure 2:
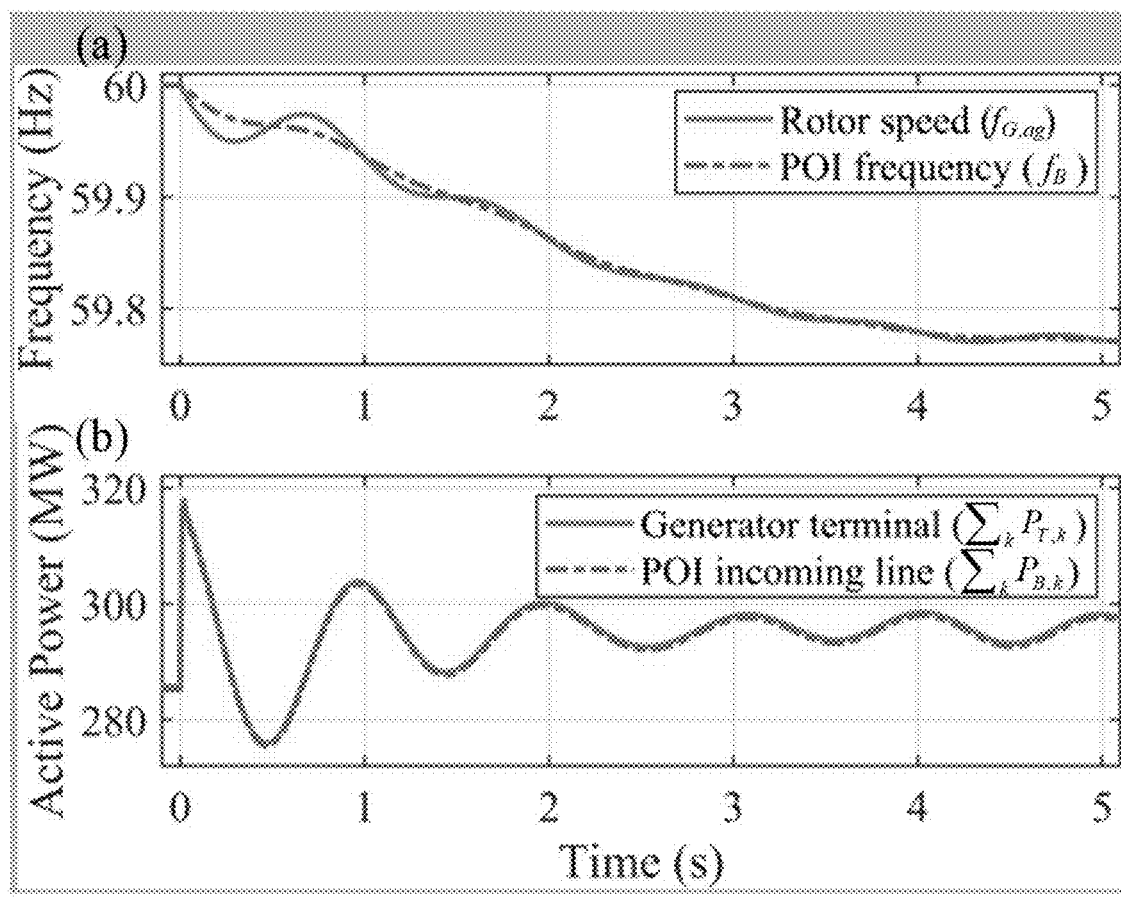
FIG. 2 shows exemplary measurements of the power-plant PMU and the POI-substation PMU according to an exemplary embodiment of the present disclosure.

In fact, the electrical distance between one POI and the connected generators could be large, which would lead to a significant difference between the generator dynamics model represented by the POI measurement and the actual value, i.e., $f_B \neq f_{G,ag}$ in eq. (3). Taking the modified IEEE 39-bus System as an example, the field condition of the POI is set as FIG. 1. The active power of the load connected to Bus 15 suddenly increases at t=0 s. The aggregated generators undertake the disturbance power and begin to decelerate. For G02, the frequency and active power are shown in FIG. 2. FIG. 2 shows exemplary measurements of the power-plant PMU and the POI-substation PMU according to an exemplary embodiment of the present disclosure.

As shown in FIG. 2(a), the POI frequency could be different from the rotor speed of the aggregated generator, especially at the beginning of the frequency disturbance event. This phenomenon is known as the frequency spatial distribution characteristic, which is caused by the relative angle swing among generators. It would be more pronounced in large power systems with high-level RPG penetration. Therefore, the POI frequency might lead to great error in the results of inertia estimation. Meanwhile, since PMUs cannot measure mechanical power, it is difficult to estimate inertia continuously using ambient measurement data.

D. The Frequency Spatial Correlation: A Linear Expression

The frequencies of all the network electrical quantities, including the bus frequency, are determined by the internal electromotive force (EMF) frequencies (those are the rotor speeds) of all the synchronous generators, and the internal EMF of the generator is formed by the magnetic field of the rotor windings cutting the stator windings. In the sequel, the frequency divider-based linear expression describing the frequency spatial correlation is presented.

Consider a power system with N network buses and M POI buses, with the generators connected to the same POI being considered as one aggregated generator. For simplicity, the aggregated generator and the individual generators are not distinguished hereinafter. The generator model is the classical second-order model, which is described by the transient reactance $x_d'$ and the internal EMF $E'=E' \angle \delta$. The network equation extended to the internal EMF is expressed as $$\begin{bmatrix} I_G \\ I_D \end{bmatrix} = \begin{bmatrix} Y_{GG} & Y_{GD} \\ Y_{DG} & Y_{DD} \end{bmatrix} \begin{bmatrix} E' \\ U_D \end{bmatrix}, \quad (4)$$

where $I_G \in \mathbb{C}^{M \times 1}$ and $I_D \in \mathbb{C}^{N \times 1}$ denote the current phasor injected from the internal EMF and the network bus, respectively; $I_D \approx 0$, since the load current is relatively small compared to the generator current and does not change rapidly; $E' \in \mathbb{C}^{M \times 1}$ and $U_D \in \mathbb{C}^{N \times 2}$ denote the internal EMF phasor and the network bus voltage phasor, respectively; and $Y_{GG}$, $Y_{GD}$, $Y_{DG}$, and $Y_{DD}$ are the submatrices of the admittance matrix Y, which are related to the transient reactance, line parameters, and system topology.

Taking the derivative of the second row of (4) w.r.t. time, assuming that $|E'|=1$ p.u. and $|U_D|=1$ p.u., and ignoring the conductance part of the admittance matrix, the frequency divider formula can be derived [28]

$$0_{N\times 1}=B_{DG}\Delta f_G B_{DD}\Delta f_D, \quad (5)$$

where $\Delta f_G \in \mathbb{R}^{M\times 1}$ denotes the value of the rotor speed deviating from the normal operating point, i.e., $\Delta f_G = f_G - 1_{M\times 1}$; $\Delta f_D \in \mathbb{R}^{N\times 1}$ denotes the value of the bus frequency (including POI) deviating from the normal operating point, i.e., $\Delta f_D = f_D - 1_{N\times 1}$; and $B_{DG}=\text{imag}(Y_{DG})$ and $B_{DD}=\text{imag}(Y_{DD})$ are the imaginary parts of the admittance matrices.

Furthermore, by calculating the Moore Penrose inverse of (5), the rotor speed can be expressed as:

$$\Delta f_G = -B_{DG}^+ B_{DD}\Delta f_D. \quad (6)$$

In (6), $B_{DD}$ is sparse. It should be noted that there is no load connected to either the low or high side of the GSU. Therefore, the current injected by the POI is merely related to the internal EMF and the voltage of the sub-POI, as shown in the second row of (4). Consequently, the rotor speed is only related to the frequencies of its POI bus and sub-POI buses.

For POI-level inertia estimation, the advantage of (6) is that the rotor speed of the generator can be calculated quickly by using the substation PMU measurement. However, this approach requires each non-POI bus to be equipped with a PMU, which would increase the PMU installation budget. For a power system with M POIs, the number of installed PMUs should be several times greater than M, where the exact number of PMUs depends on the connection topology between the POI and sub-POIs.

In what follows, an online estimation approach for the overall inertia of the power system is devised, where the spatial resolution is the POI-level aggregated inertia. The PMUs only need to be placed at POI buses, and the remaining PMUs can improve the robustness of the proposed method against data quality issues. The lack of POI frequency measurement can also be overcome. The estimation error caused by the frequency spatial distribution and immeasurable mechanical power can thus be eliminated.

III. The Exemplary Inertia Estimation Methodology

The organization of this section is as follows: the spatial correlation of power system frequency and the general correlation between rotor speed and network bus frequency are comprehensively described in Sections III-A and III-B, respectively. The principle of active PMU measurements for inertia estimation is described in Section III-C, where the impact of redundant and lacking PMU measurements is analyzed. The ambient measurement-based POI-level inertia estimation method is described in Section III-D. Finally, the system-level inertia estimation procedure is described in Section III-E.

A. Frequency Spatial Correlation Analysis

The spatial correlation of power system frequencies hides in (5), which is analyzed in detail to provide a basis for rotor speed calculation.

Similar to $B_{DD}$, the sparsity of $B_{DG}$ in (5) depends on the connection topology between the internal EMF, say E', and network buses, say $U_D$. The element in $B_{DG}$ would be nonzero if it is related to the current injection from the POI.

Therefore, $B_{DG}$ can be rearranged in terms of POI and non-POI elements, which reads $$\begin{bmatrix} 0_{M\times 1} \\ 0_{N\times 1} \end{bmatrix} = \begin{bmatrix} \text{diag}(b_{GB}) & B_{DB} \\ 0_{N\times M} & B_{DL} \end{bmatrix} \begin{bmatrix} \Delta f_G \\ \Delta f_D \end{bmatrix}. \quad (7)$$

In (7), $\text{diag}(b_{GB}) \in \mathbb{R}^{M\times M}$ is a diagonal matrix corresponding to the connection between the internal EMF and its POI, and the element $b_{GB}=1/(x_d'+x_T+x_L)$ includes the aggregated transient reactance, the aggregated reactances of the GSU and the transmission line; the submatrix corresponding to non-POI is $0_{N\times m}$. In fact, eq. (7) admits a comprehensive relationship of the network bus frequencies, where its first and second rows have different insights and are discussed separately.

1) The First Row of (7): Since $\text{diag}(b_{GB})$ is a square matrix, its inverse matrix is available, rendering:

$$\Delta f_G = -\text{diag}(b_{GB})^{-1} B_{DB}\Delta f_D. \quad (8)$$

From (8), the generator rotor speed can be expressed as a linear function of the network bus frequency. It is proven in the Appendix that (8) and (6) are identical. Due to the sparsity of $B_{DB}$, only the frequency of POI and sub-POI frequencies are needed for the rotor speed calculation. Considering that an aggregated generator is connected to its POI and the POI is further connected to J sub-POIs, as shown in FIG. 3(a), the expression of the rotor speed is:

$$\Delta f_{G,i} = -\frac{1}{x_{G,i}}\Big(\sum (x_{G,i}+x_{L,j,j+1}+\ldots+x_{L,j,j+J})\Delta f_{D,j} - \quad (9)$$

$$x_{L,j,j+1}\Delta f_{D,j+1}\ldots x_{L,j,j+J}\Delta f_{D,j+J}\Big).$$

Figure 3:
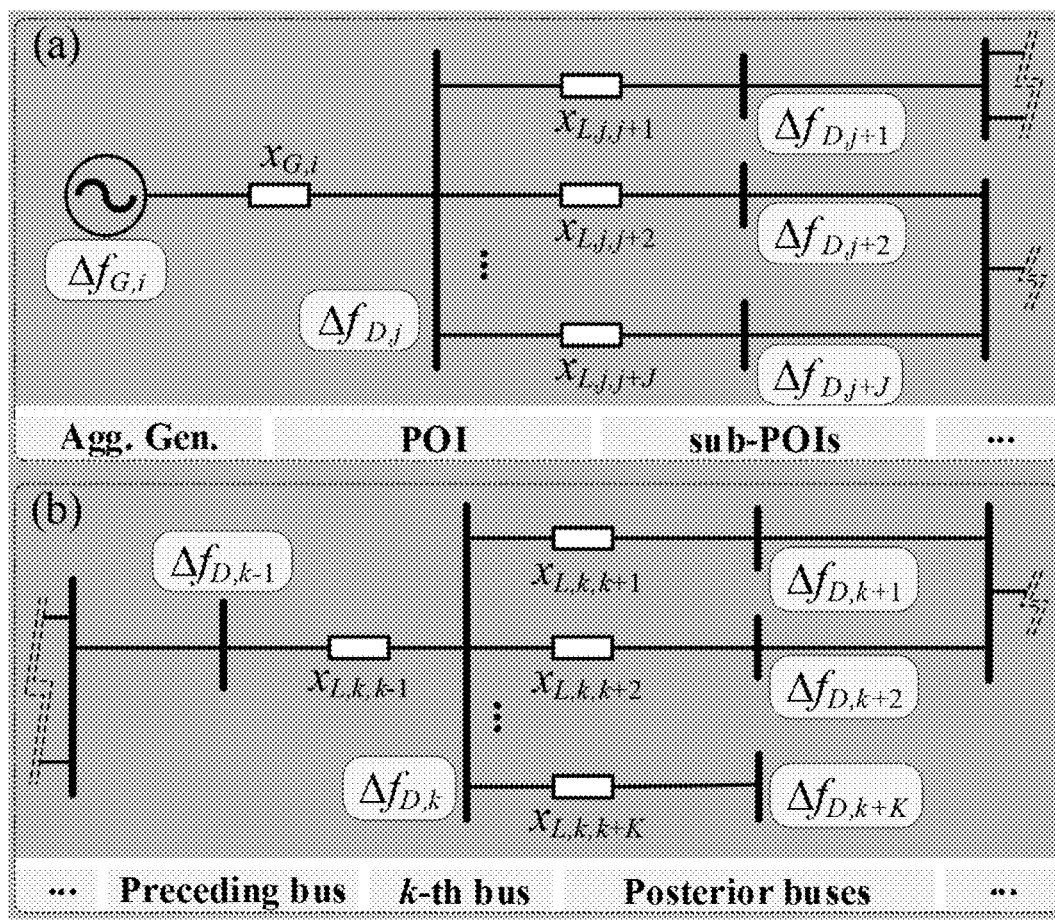
FIG. 3 shows an exemplary schematic of frequency spatial relationship according to an example embodiment of the present disclosure.

FIG. 3 shows an exemplary schematic of frequency spatial relationship according to an example embodiment of the present disclosure.

2) The Second Row of (7): Its compact form is as follows:

$$0_{N\times 1} = B_{DL}\Delta f_D. \quad (10)$$

Considering that $B_{DL}$ is also highly sparse, the frequency of one bus is linearly correlated with the frequencies of buses that are electrically interconnected. Taking bus k in FIG. 3(b) as an example, the linear relationship between its frequency and its neighboring bus frequencies is:

$$0 = \Sigma(x_{L,k,k-1}+x_{L,k,k+1}+\ldots+x_{L,k,k+K})\Delta f_{D,k} - \\ x_{L,k,k-1}\Delta f_{D,k-1} - x_{L,k,k+1}\Delta f_{D,k+1} - \ldots - \\ x_{L,k,k+K}\Delta f_{D,k+K}. \quad (11)$$

From (8), the bus frequencies of all POIs and sub-POIs should be measured to obtain the rotor speed of each generator. Meanwhile, (10) depicts the linear relationship between the frequencies of certain network buses, including the POI frequency and its sub-POI frequencies. Combining (8) and (10), the number of PMUs for inertia estimation can be significantly reduced.

B. Relationship Between Rotor Speed and Bus Frequency

The relationship between the rotor speed $\Delta \hat{f}_{G,i}$ of the i-th generator and the bus frequencies is expressed by the i-th row in the (8), which is:

$$\Delta \hat{f}_{G,i} = -b_{GB,i}^{-1} B_{DB,i}\Delta \hat{f}_D. \quad (12)$$

In (12), $B_{DB,i} \in \mathbb{R}^{1\times N}$ represents the i-th row in $B_{DB}$; $\Delta \hat{f}_D \in \mathbb{R}^{N\times 1}$ denotes the relevant bus frequencies, where only the elements corresponding to POI and sub-POI are critical considering the sparseness of $B_{DB,i}$.

If $\Delta\hat{f}_{G,i}$ corresponds strictly to the combination of a certain L network buses $\Delta f_{D,me}^{(i)} \in \mathbb{R}^{L \times 1}$, $\Delta f_{D,me}^{(i)} \subset \Delta\hat{f}_D$ and satisfies:

$$\Delta f_{D,me}^{(i)} = E\Delta\hat{f}_D, \quad (13)$$

where $E \in \mathbb{R}^{L \times N}$ is a sparse matrix and its elements are either 1 or 0. Combining (10), (13) can be extended as:

$$\begin{bmatrix} 0_{L \times 1} \\ 0_{N \times 1} \end{bmatrix} = \begin{bmatrix} \Lambda_L & -E \\ 0_{N \times L} & B_{DL} \end{bmatrix} \begin{bmatrix} \Delta f_{D,me}^{(i)} \\ \Delta\hat{f}_D \end{bmatrix}, \quad (14)$$

where $\Lambda_L \in \mathbb{R}^{L \times L}$ is a diagonal matrix and all its diagonal elements equal to 1. Then, (14) can be further deformed as:

$$\begin{bmatrix} -E \\ B_{DL} \end{bmatrix} \Delta\hat{f}_D = -\begin{bmatrix} \Lambda_L \\ 0_{N \times L} \end{bmatrix} \Delta f_{D,me}^{(i)}. \quad (15)$$

Note that (15) admits a set of linear equations in the form of $Ax=b$. The Full Solutions of $\Delta\hat{f}_D$ can be expressed as:

$$\Delta\hat{f}_D = -\begin{bmatrix} -E \\ B_{DL} \end{bmatrix}^+ \begin{bmatrix} \Lambda_L \\ 0_{N \times L} \end{bmatrix} \Delta f_{D,me}^{(i)} + \left(\Lambda_N - \begin{bmatrix} -E \\ B_{DL} \end{bmatrix}^+ \begin{bmatrix} -E \\ B_{DL} \end{bmatrix}\right)\zeta = \quad (16)$$
$$-C\Delta f_{D,me}^{(i)} + D\zeta.$$

In (16), the first term is the Particular Solution, which is given in the form of the Moore-Penrose inverse; the second term is the General Solution, indicating a linear combination of the vectors in the coefficient matrix D to $\zeta$; $\zeta \in \mathbb{R}^{N \times 1}$ is a vector composed of arbitrary coefficients; particularly, D is a zero matrix when $[-E \; B_{DL}]^T$ is full rank.

Substituting (16) into (12), we have $$\Delta\hat{f}_{G,i} = b_{GB,i}^{-1} B_{DB,i} C \Delta f_{D,me}^{(i)} - b_{GB,i}^{-1} B_{DB,i} D\zeta, \quad (17)$$

In (17), the first term represents the correlation between the rotor speed $\Delta\hat{f}_{G,i}$ and the measured network bus frequency $\Delta f_{D,me}^{(i)}$, which is related to the system parameter and topology; the second term is merely related to the system parameter and topology. The measured frequencies of L network buses are strictly related to $\Delta\hat{f}_{G,i}$ when the following two constraints are satisfied:

1) Frequency Dynamic Constraint: $b_{DB,i} D\zeta = 0$, and $b_{GB,i}^{-1} B_{DB,i} C 1_{L \times 1} = 1$. This constraint ensures that (17) agrees with the power system frequency dynamics. First, the second term in (17) should be 0, i.e., the rotor speed of the generator cannot be accurately calculated only with the system parameter and topology information. Second, when the frequencies of L buses $\Delta f_{D,me}^{(i)}$ are 1 p.u., $\Delta\hat{f}_{G,i}$ should also be 1 p.u.

ii) Nonredundant Constraint: $\text{rank}([-E \; B_{DL}]^T) = L+N$ and $(\forall x \in (b_{GB,i}^{-1} B_{DB,i} C), x \neq 0)$. This constraint ensures that the L-bus frequency combination is nonredundant. First, the matrix $[-E \; B_{DL}]^T$ must be full rank. Second, the vector $b_{GB,i}^{-1} B_{DB,i} C$ cannot have zero elements, as zero elements indicate that frequencies at certain buses would not contribute to $\Delta\hat{f}_{G,i}$.

Figure 4:
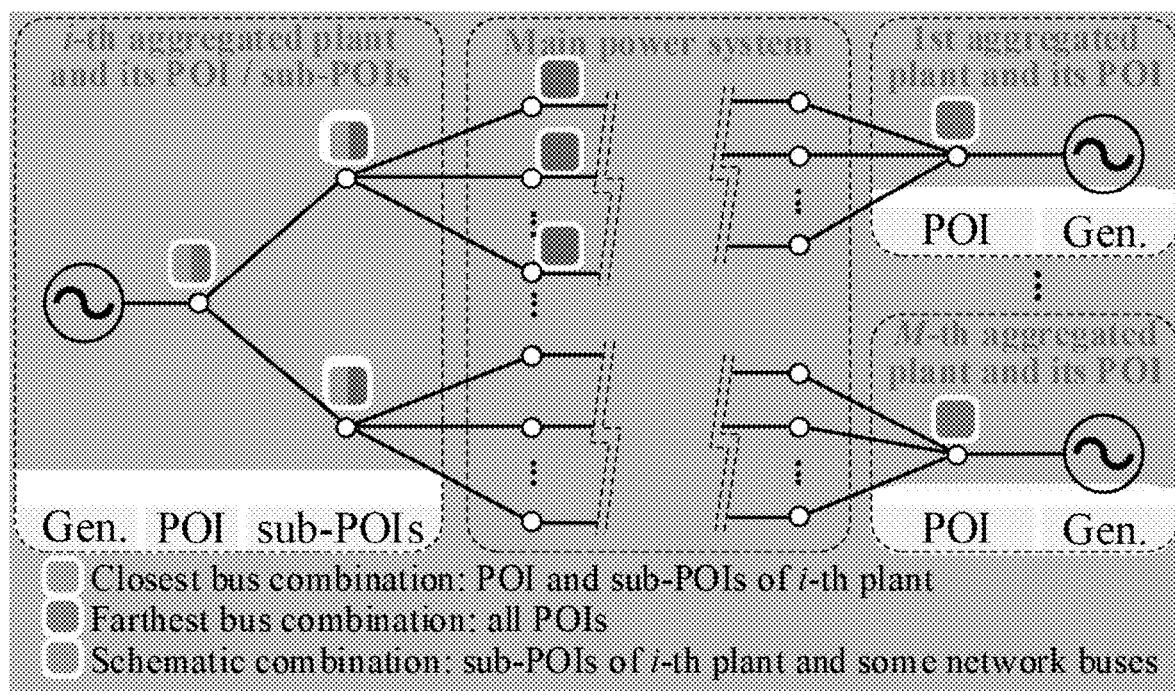
FIG. 4 shows exemplary three correlation cases between the generator rotor speed and the network bus frequencies according to an example embodiment of the present disclosure.

FIG. 4 shows exemplary three correlation cases between the generator rotor speed and the network bus frequencies according to an example embodiment of the present disclosure. Take the rotor speed calculation of the i-th generator in a multimachine power system as an example, as shown in FIG. 4. Its closest network bus combination is the POI and sub-POIs of the i-th generator, which is given in (12), and its farthest bus combination consists of the POIs of all generators since all POIs constitute the boundary of the network. In addition, there are many different bus combinations in addition to these two extreme cases, which can be verified by constraints i) and ii). The schematic of these qualified combinations is shown in FIG. 4, including sub-POIs and a part of the next-level network buses to which they are connected. Thus, each bus combination satisfies $$\Delta\hat{f}_{G,i} = b_{GB,i}^{-1} B_{DB,i} C \Delta f_{D,me}^{(i)}, \quad (18)$$

C. Active PMU Measurement for POI-Level Inertia Estimation

From (3), the frequency, terminal active power and mechanical power should be given to calculate the aggregated inertia constant, whereas the first two state variables can be calculated indirectly from the POI-bus PMU measurement.

1) Active Frequency Measurements: As mentioned in Section III-B, to estimate the aggregated inertia at all the POI buses, all their frequencies should be monitored, i.e., $S_{f,min} = \Delta f_{D,me}^{(1)} \cap \ldots \cap \Delta f_{D,me}^{(i)} \cap \ldots \cap \Delta f_{D,me}^{(M)} = \Delta f_{D,me}^{(POI)}$. The rotor speeds of all the generators then can be obtained from:

$$\Delta\hat{f}_G = \text{diag}(b_{GB})^{-1} B_{DB} \begin{bmatrix} E \\ B_{DL} \end{bmatrix}^+ \begin{bmatrix} \Lambda_L \\ 0_{N \times L} \end{bmatrix} \Delta f_{D,me} \quad (19)$$
$$= A\Delta f_{D,me}$$

where $A \in \mathbb{R}^{M \times M}$ suggests a linear correlation between rotor speeds and POI bus frequencies. If the frequencies of more buses are measurable, then $(\dim(S_f) = L, L > M) \wedge (S_{f,min} \subset S_f)$. The calculation of $\Delta\hat{f}_D$ becomes the following weighted least squares problem:

$$\min_{\Delta\hat{f}_D} e^T W e \quad (20a)$$

$$e = \begin{bmatrix} \Lambda_L \\ 0_{N \times L} \end{bmatrix} \Delta f_{D,me} + \begin{bmatrix} -E \\ B_{DL} \end{bmatrix} \Delta\hat{f}_D, \quad (20b)$$

where $W \in \mathbb{R}^{(L+N) \times (L+N)}$ denotes the diagonal matrix related to the measured frequency data quality at each measurement point. In extreme cases, certain PMUs may face severe data quality issues, for example, the extreme noise level due to RPG penetration and the bad data issue due to cyber-attacks, which could be mitigated by adjusting the weight matrix W. At this point, equation (20) can be solved and the rotor speed can be calculated as follows:

$$\Delta\hat{f}_{G,W} = \text{diag}(b_{GB})^{-1} B_{DB} \begin{bmatrix} E \\ B_{DL} \end{bmatrix}_W^+ \begin{bmatrix} \Lambda_L \\ 0_{N \times L} \end{bmatrix} \Delta f_{D,me} = A_W \Delta f_{D,me}, \quad (21)$$

where $[[-E \; B_{DL}]^T]_W^+ = ([-E \; B_{DL}] W [-E \; B_{DL}]^T) [-E \; B_{DL}] W$ represents the solution of (20). The value of the weighting factor is strongly related to the field conditions, which can be adjusted online according to the noise level and the amount of bad data points in the measured frequency segment. Furthermore, the value of the weighting factor is also related to the location of the PMU facing data quality issues. As shown in (21), when the values of the corresponding elements in $A_W$ (considering $W = 1_{(L+N) \times (L+N)}$) are larger, the measured frequency by a PMU has a greater contribution to the rotor speed calculation result. At this time, its weighting factor should take a smaller value.

In addition, if there is no frequency data obtained at certain POI substations, other PMU combinations can be selected and it can then be determined whether they are qualified according to the Frequency Dynamic Constraint and Nonredundant Constraint in Section III-B.

2) *Active Measurements of Active Power:* As mentioned above, the terminal active power of the generator should be known. In practice, the active power at the POI incoming line is almost the same as that at the generator terminal because the resistance in the high-voltage grid is much smaller than the reactance. Moreover, assuming that the empirical resistance value of the aggregated line and transformer, denoted as r, is known, the approximate active power at the terminal can be obtained as follows:

$$\hat{P}_T = P_{B,me} + \text{diag}(r) I_{B,me}^2, \tag{22}$$

where $I_{B,me} \in \mathbb{R}^{M \times 1}$ and $P_{B,me} \in \mathbb{R}^{M \times 1}$ are the current and active power of the incoming line measured by the POI-bus PMU, respectively, and $\text{diag}(r) \in \mathbb{R}^{M \times M}$ is a diagonal matrix. Thanks to (22), the active power at the generator terminal can be estimated using the active power measurements of the POI bus. Therefore, PMUs must be placed at all POI buses for active power measurement, i.e., $\mathcal{S}_P = P_{B,me}$.

In summary, as expected, the minimum set of PMU placements required for POI-level inertia estimation is all POI buses, i.e., $\mathcal{S}_{fP,min} = \mathcal{S}_{f,min} \cap \mathcal{S}_P$. The redundant PMU placement will improve the robustness of the rotor speed calculation. The lack of POI frequency measurement can also be overcome.

As a result, the rotor speed and terminal active power of each generator are available.

D. *Estimation of the POI-Level Aggregated Interia*

It should be kept in mind that the goal is to calculate the aggregated inertia constant from (3), and until now, both the mechanical power and inertia constant are unknown. As the mechanical power cannot be measured by the PMU, it is often assumed that the power system is in steady-state at the beginning of the estimation window. Thus, the disturbance must be large enough to distinguish it from the steady state with the assumption that the power system is strictly steady-state before the disturbance, which is not suitable for ambient conditions.

In practice, the mechanical power can be regarded as a constant within the inertia estimation time window, which is relatively small, as both the inertia of the generator-turbine and the time constant of the governor are large. Therefore, both the inertia constant and mechanical power can be estimated simultaneously by parameter identification as follows:

$$2\hat{H}_{ag} p y(t) = \Delta \hat{P}_m u_1(t) + u_2(t), \tag{23a}$$

$$\bar{y} = \{0, \hat{f}_G(t_2) - \hat{f}_G(t_1), \hat{f}_G(t_3) - \hat{f}_G(t_1), \ldots, \hat{f}_G(t_K) - \hat{f}_G(t_1)\}, \tag{23b}$$

$$\bar{u}_1 = \{1,1,1, \ldots, 1\}, \tag{23c}$$

$$\bar{u}_2\{0, -\hat{P}_T(t_2) + \hat{P}_T(t_1), -\hat{P}_T(t_3)\,\hat{P}_T(t_1), \ldots, -\hat{P}_T(t_K) + \hat{P}_T(t_1)\}. \tag{23d}$$

Eq. (23a) represents a multiple-input-single-output (MISO) system, in which $\{\hat{H}_{ag}, \Delta\hat{P}_m\}$ is the parameter vector to be identified; y(t) and $u_2(t)$ are the values of rotor speed and active power deviation from the operating point, respectively; and $u_1(t)$ represents the mechanical power and remains constant in this case. Eq. (23b)-(23d) describes the samples.

Considering the performance in identification accuracy, calculation time, and adaptability to ambient conditions, the off-the-shelf continuous-time system identification method based on the least squares principle is applied, which can be directly invoked from the system identification toolbox of MATLAB. In addition, the window length of parameter identification, i.e., K in (23), should be large considering the ambient conditions and the fact that the disturbance location may be far from the generator to be estimated.

E. *System-Level Inertia Estimation Procedure*

Figure 5:
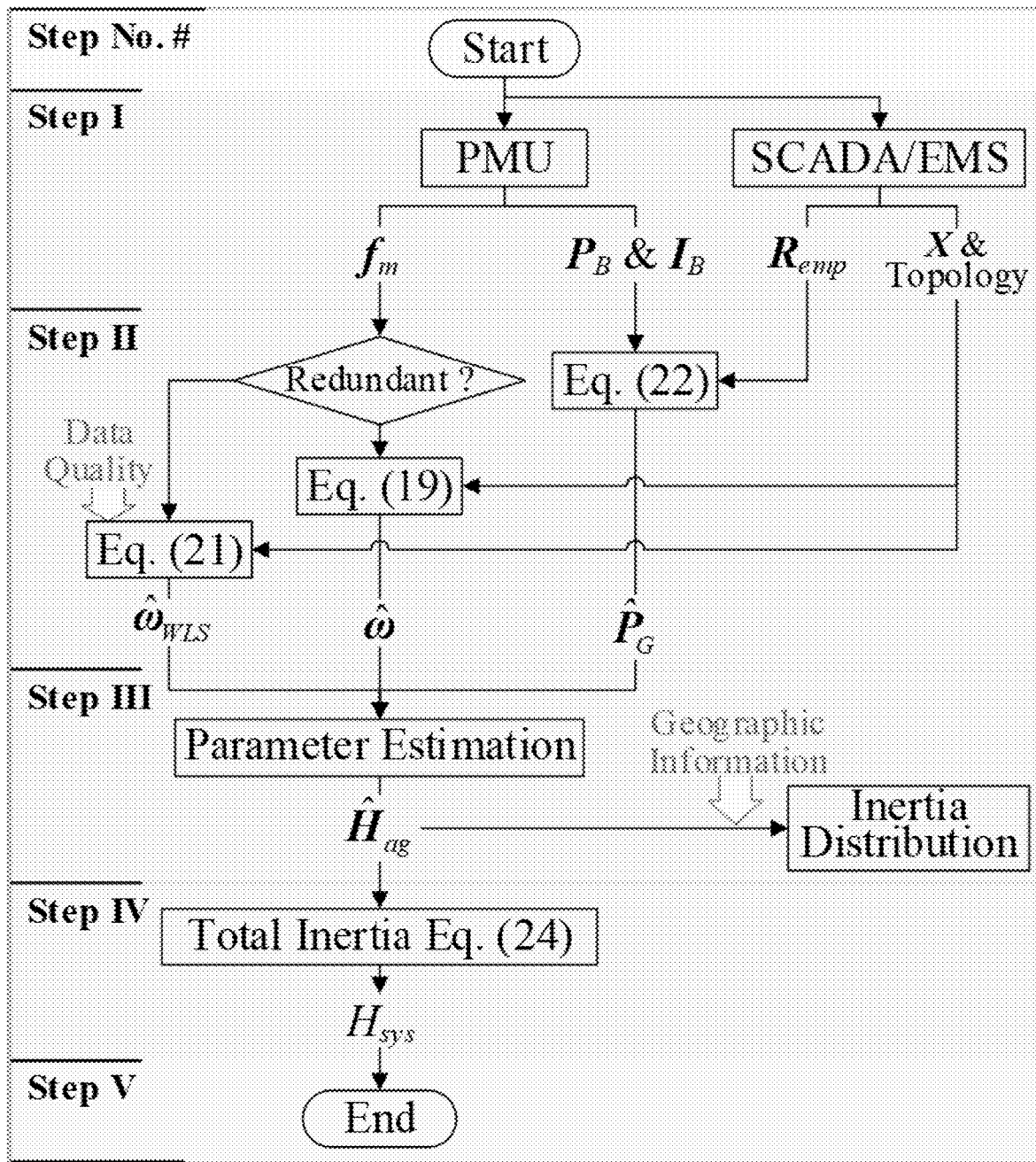
FIG. 5 shows the flowchart of an exemplary system-level inertia estimation procedure according to an exemplary embodiment of the present disclosure.

FIG. 5 shows the flowchart of an exemplary system-level inertia estimation procedure according to an exemplary embodiment of the present disclosure.

Step 1: Data Collection. Collect the system topology, reactance and resistance values of transmission lines from the SCADA/EMS system. Gather frequency and active power samples from the PMUs installed at the POI buses.

Step 2: Intermediate Variable Calculation. Calculate the active power $\hat{P}_T$ at the POI-level aggregated generator terminal and the rotor speed $\hat{f}_G$ of the POI-level aggregated generator according to (22) and (19), respectively. If the frequency of POI PMU is not available, (19) is also adopted under the adjusted PMU combination. If the data of the non-POI PMUs are available, calculate (21) and obtain the weighted-least-squares solution $\hat{f}_{G,W}$. It should be noted that (21) is the solution of (21), which is not used for calculation.

Step 3: POI-level Aggregated Inertia Estimation and Demonstration. The parameter identification problem (23) is solved for each POI bus. Combining the POI-level aggregated inertia with the power plant locations, the inertial spatial distribution characteristics can be demonstrated. Step 4: System-level Inertia Estimation. The system-level inertia can be obtained by $$\hat{H}_{sys,t} = \frac{\sum_i \hat{H}_{ag,i} S_{ag,i}}{\sum_i S_{ag,i}}, \forall t \tag{24}$$

where $\hat{H}_{ag,i}$ and $S_{ag,i}$ are the POI-level aggregated inertia constant and rated capacity of generator i, respectively.

Taking a power system where the PMUs are installed at all POI buses as an example, the application procedure for estimating system-level inertia is illustrated. First, the frequency and active power of all POI buses are measured by POI PMUs, and the system topology, reactance and resistance of transmission lines are gathered from the SCADA/EMS system. Then, for each POI bus, the rotor speed of POI-level aggregated generator is calculated according to the frequency of POI PMU; the active power at POI-level aggregated generator terminal is calculated according to the active power of POI PMU. Further, the POI-level aggregated inertia is calculated for each POI bus using the above rotor speed and terminal active power. Finally, the system-level inertia is calculated according to the POI-level aggregated inertia of all POI buses.

There are several benefits to the exemplary embodiments of the present disclosure. The inertia estimation results can be applied to the online assessment of power system frequency stability. First, when the location and intensity of potential disturbances in power system are forecast, the frequency stability indexes, e.g., the post-disturbance RoCoF and frequency nadir, can be estimated according to the system-level inertia and POI-level aggregated inertia of all POI buses. Further, the power system operator can determine whether the estimated indexes reach the limitation. When the limitation is reached, the power system cannot meet the frequency stability. The under-frequency load shedding (UFLS) will be triggered after disturbance, leading to the power system blackout. In this case, the power system operator needs to start up more generators to increase the system online inertia. When the limitation is not reached, the frequency stability margin can be evaluated.

Remark 1: The calculation error of (19) comes from the Frequency Divider (5), mainly including the use of the classical second-order generator model in (4) and neglecting the line resistance. However, the error of (5) is small. In addition, compared to the synchronous generator, the current that the RPG injects into the network can only slightly change when the VI does not act, and the RPG can be approximately viewed as load (that is, $I_D$ in (4)). Therefore, (19) would also barely be affected by the penetrated RPG. It should be noted that the influence of the above error can be further reduced by the least-squares-based parameter identification method. Moreover, the noise caused by RPG penetration and other disadvantages in measurement can be filtered by increasing the window length of the parameter identification or adding additional low-pass filters.

Remark 2: Compared with the existing inertia estimation methods, only several lightweight algebraic equations are calculated in Step 2, which could relax the requirement of equipping one PMU for every generator. Therefore, the complexity of the proposed method has not been increased a lot, considering the parameter identification step is necessary for all the methods. The required calculation time mainly comes from the window length of parameter identification in Step 3. It is necessary to coordinate the calculation accuracy and time delay to choose the proper window length of parameter identification in the field application.

IV. Simulation Results

Figure 6:
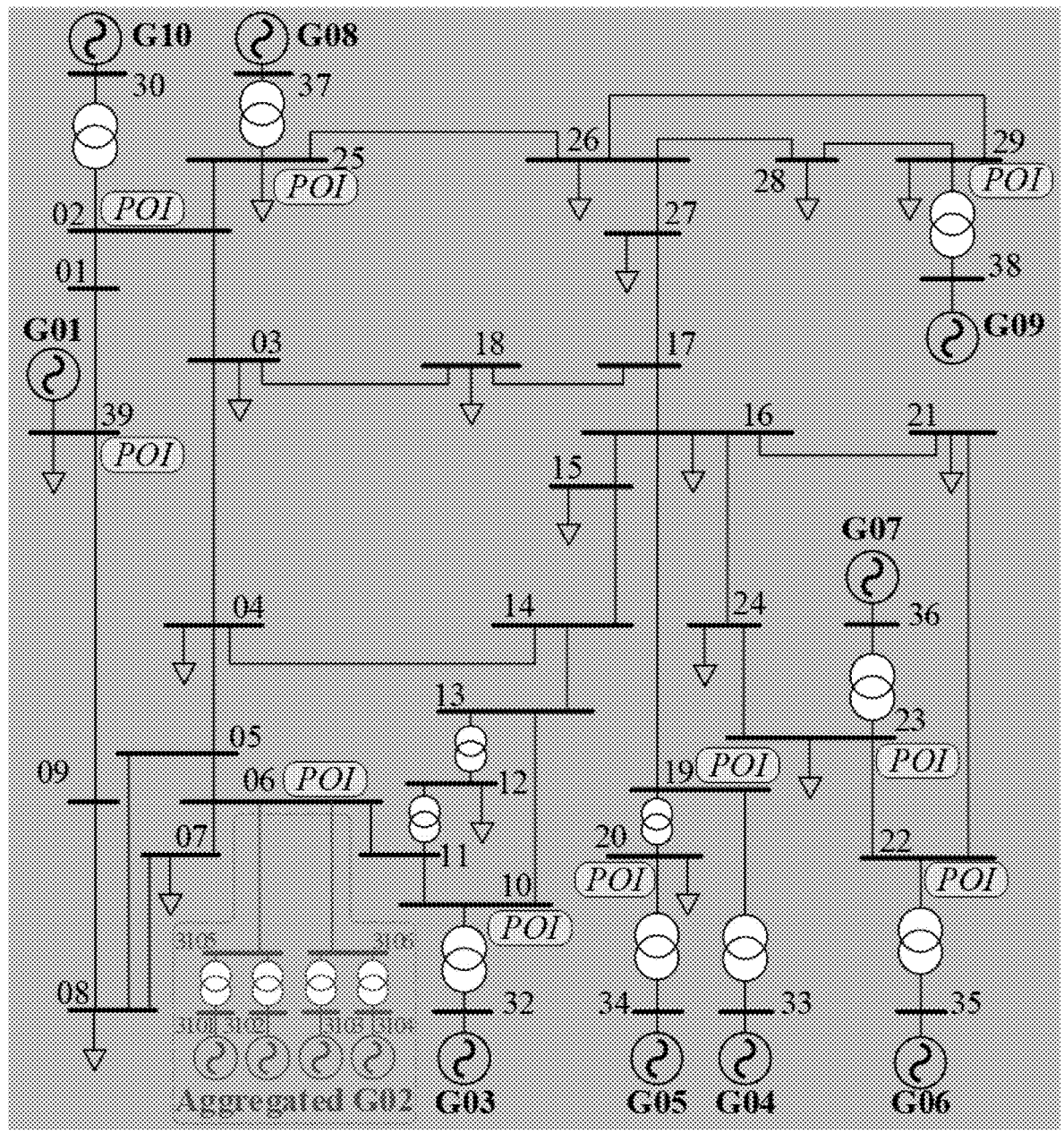
FIG. 6 shows an exemplary modified IEEE 39-bus System according to an exemplary embodiment of the present disclosure.

FIG. 6 shows an exemplary modified IEEE 39-bus System according to an exemplary embodiment of the present disclosure. The exemplary method is validated in the modified IEEE 39-bus System, whose topology is shown in FIG. 6. It has 10 POI buses, which are {39,06,10,19,20,22,23,25, 29,02}. Multiple generators or power plants are connected to each POI bus through the GSU and transmission line, taking the aggregated G02 as an example. The inertia constants of aggregated generators are shown in Table II. All generators are equipped with automatic voltage regulators (AVRs), governors, and power system stabilizers (PSSs).

TABLE II

The inertia constant of aggregated generator

| Gen. Number | Inertia Constant (s) |
|---|---|
| G01 | 50.00 |
| G02 | 3.03 |
| G03 | 3.58 |
| G04 | 2.86 |
| G05 | 2.60 |
| G06 | 3.48 |
| G07 | 2.64 |
| G08 | 2.43 |
| G09 | 3.45 |
| G10 | 4.20 |

A. Preperations and Settings

1) Evaluation Indexes: To evaluate the performance of the proposed method, several indexes are defined as follows.

i) Rotor Speed Calculation Error ($f_E$): Let the rotor speed calculated by (19) or (21), and its actual value is $\hat{f}_{G,i}$ and $f_{G,i}$ respectively. The actual value of the rotor speed of an aggregated generator is equal to that of each component generator due to the coherency. The mean absolute error over K time intervals is $$f_{E,i} := \underset{\forall k \in K}{\text{avg}}\left(\left|\hat{f}_{G,i}(k) - f_{G,i}(k)\right|\right)$$

in $10^{-5}$ Hz.

ii) Inertia Constant Estimation Error ($H_C$): Let the inertia constant estimation result of the i-th generator and the true value be $\hat{H}_{ag,i}$ and $H_{ag,i}$, respectively. The mean absolute error of inertia constant over K time intervals is $$H_{C,i} := \underset{\forall k \in K}{\text{avg}}\left(\left|\hat{H}_{ag,i}(k) - \hat{H}_{ag,i}(k)\right|\right) / H_{ag,i}(k) \times 100$$

in %.

iii) Error of the Median of the Estimated Inertia Constant ($H_M$): The measured data may have high-level noise, and the estimated inertia constant would also be random. The median of the estimation results over K time intervals can be taken as the final result, i.e., $$H_{M,i} := \left|\underset{\forall k \in K}{\text{med}}(\hat{H}_{ag,i}(k)) - H_{ag,i}(k)\right| / H_{ag,i}(k) \times 100 \text{ in \%}.$$

Both $H_c$ and $H_M$ reflect the accuracy of POI-level inertia estimation.

iv) Error of the Quantile of the Estimated Inertia Constant ($H_p$): The maximum error in the 25% and 75% quantiles of the estimation results over K time intervals is $$H_{P,i} := \max\left(\left|\underset{\forall k \in K}{prc_{25}}(\hat{H}_{ag,i}(k)) - H_{ag,i}(k)\right|, \left|\underset{\forall k \in K}{prc_{75}}(\hat{H}_{ag,i}(k)) - H_{ag,i}(k)\right|\right) / H_{ag,i}(k) \times 100 \text{ in \%}.$$

$H_P$ denotes the concentration of the inertia estimation results.

2) PMU Placement Requirement: To measure the POI-level aggregated active power, PMUs must be placed at all the POI buses, and the set of monitored buses is $S_p$={39, 06,10,19,20,22,23,25,29,02}. As mentioned in Section III-C, the minimum set of network buses required to calculate the rotor speeds of all the generators is $S_{f,min}$={39,06,10, 19,20,22,23,25,29,02}, which is also all the POI buses. In summary, the minimum set of PMU placement is $S_{fP,min}$= $S_p \cap S_{f,min}$, i.e., all POI buses. In addition, redundant PMU placement can improve the robustness of the rotor speed calculation to data quality issues. The rotor speed calculation can also be realized without POI frequency measurement. In the following simulations, the PMUs are merely placed at the POI buses unless specified.

3) General Settings of the Evaluation Scenarios: The ambient frequency dynamics are simulated for inertia estimation, where the load active power at one random bus increases or decreases by any value at random intervals. The locations of ambient load disturbances are set at all POIs. The value of the active power change is less than 0.1% of the total active power of the power system, and the maximum frequency deviation does not exceed 0.003 Hz, which is within the dead-band of the governor.

The time scale of the generator inertia response is on the order of several seconds, so the window length of parameter identification is set as 10 seconds. The sampling rate of active power and frequency is set to 120 Hz, which agrees with the PMU reporting rate. The bus frequency measured in a short time after an active power load change is filtered and interpolated considering the fast fluctuation caused by the electromagnetic dynamics and the phase step.

B. Method Validation in the Base Case

Figure 7:
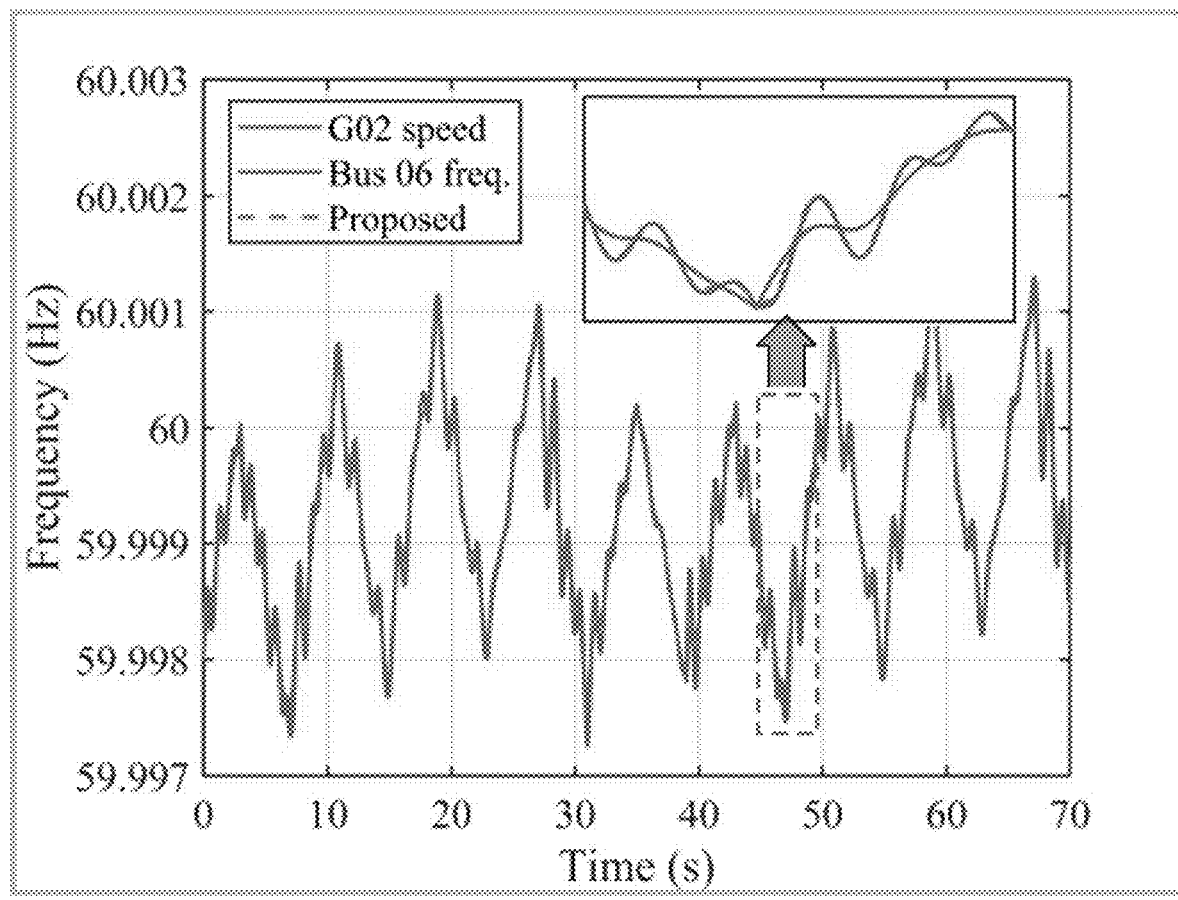
FIG. 7 shows the accuracy of the exemplary rotor speed calculation method (G02) according to an example embodiment of the present disclosure.

1) Rotor Speed Calculation: FIG. 7 shows the accuracy of the exemplary rotor speed calculation method (G02) according to an example embodiment of the present disclosure. Taking the aggregated generator G02 as an example, its true rotor speed and the frequency of Bus 06, which is a POI bus, are given in FIG. 7. The POI bus frequency is not consistent with the rotor speed of the aggregated generator connected to it. The POI frequency is established by the dynamics of all generators, which could be regarded as their weighted sum. Therefore, the intensity of the high-frequency oscillation component in of the POI frequency could be smaller than that of the generator behind the same POI. Nevertheless, the rotor speed estimated by the proposed approach is almost identical to the true value, demonstrating the effectiveness of the proposed rotor speed calculation method.

The rotor speed calculation errors $f_{E,i}$ of all the generators in the same load disturbance case are summarized in Table III, where the term "POI Freq." represents the deviation between the POI frequency and the true value of the aggregated generator rotor speed. It can be observed that the rotor speed calculation error of the proposed approach is always smaller than the relative difference between the POI frequency and the true value of the rotor speed of the aggregated generator. The average value $f_{E,avg}$ of the index $f_{E,i}$ (i=1, . . . , 10) is 2.41×10$^{-5}$ Hz, which is three times smaller than the average of "POI Freq.".

TABLE III

The rotor speed calculation error indexes (in 10$^{-5}$ Hz)

|  | G01 | G02 | G03 | G04 | G05 |
|---|---|---|---|---|---|
| POI Freq. | 9.54 | 12.23 | 9.89 | 7.98 | 8.79 |
| Proposed | 2.43 | 2.02 | 1.82 | 1.84 | 2.88 |
|  | G06 | G07 | G08 | G09 | G10 |
| POI Freq. | 10.45 | 7.29 | 5.89 | 15.61 | 9.63 |
| Proposed | 2.33 | 2.65 | 1.54 | 3.26 | 3.29 |

POI Freq.: $f_{E,avg}$ = 9.73
Proposed: $f_{E,avg}$ = 2.41

2) POI-level Aggregated Inertia Estimation: The simulation results of two other approaches are provided for comparison, denoted Scheme-I and Scheme-II. In Scheme-I, each generator is equipped with a power-plant PMU. The overall procedure admits two steps in which the generator inertia is estimated using the local measurements and the POI-level aggregated inertia is obtained by summing up the inertia of generators connected to the POI. Scheme-II is quite similar to the proposed approach, the only difference being that the frequency data are not processed by (19). It is worth noting that the parameter identification algorithms of Scheme-I and Scheme-II are the same as those of the proposed method.

Figure 8:
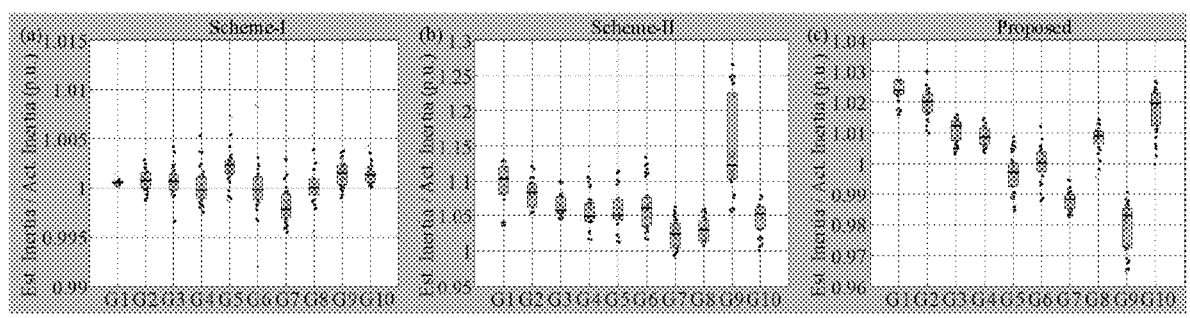
FIG. 8 demonstrates the estimated inertia of each generator according to an example embodiment of the present disclosure.

FIG. 8 demonstrates the estimated inertia of each generator under the aforementioned three approaches in the form of boxplots, where each data point represents the estimation result at a certain time. In FIG. 8, the median, 25%, and 75% percentile, outlier results (marked as red crosses), and accepted results (marked as black dots) are shown. The inertia values are given in p.u., i.e., dividing the estimated inertia by the actual inertia of each generator.

As shown in FIG. 8, the results of Scheme-I are concentrated at approximately 1 p.u., which is the true value, and enjoy the highest accuracy. The reason is that the frequency data used for parameter identification are more consistent with the generator dynamics, which is the benefit of the power-plant PMUs. Scheme-II has the lowest accuracy, and the estimated inertia is always higher than the true value because the oscillation in the POI frequency is smaller than that of the rotor speed behind it. If Scheme-II is adopted, the estimated inertia would be overly optimistic, which may have a deleterious effect on the safe operation of low-inertia power systems. The estimated inertia accuracy of the proposed approach, however, is much better than Scheme-II, and the detailed comparison can be found in Table IV. It can be observed that the average error indexes of the proposed approach are approximately 4 times better than Scheme-II in terms of average performance in all the generators. In the proposed approach, the best and worst cases are G06 and G01, respectively, while those for Scheme-II are G07 and G09, respectively. Since the disturbances at different location are triggered randomly, it can be proved that the proposed approach is adaptive to the change of disturbance locations. Although the accuracy of the proposed approach is not as good as that of Scheme-I, its accuracy is acceptable, and it does require many fewer installed PMUs. If the generators of some POI buses have power-plant PMUs, their inertia could be estimated by Scheme-I, while the aggregated inertia of the remaining POI buses could still be estimated using the proposed approach.

TABLE IV

The relative error of inertia estimation for the three approaches (in %)

|  | Scheme-II | | | Proposed | | |
|---|---|---|---|---|---|---|
|  | $H_C$ | $H_M$ | $H_P$ | $H_C$ | $H_M$ | $H_P$ |
| Average (G01-G10) | 6.68 | 6.36 | 8.82 | 1.30 | 1.25 | 1.61 |
| Best case | 2.61 | 2.46 | 3.89 | 0.41 | 0.03 | 0.38 |
| Worst case | 14.49 | 12.28 | 22.48 | 2.35 | 2.37 | 2.69 |

It is worth noting that the accuracy of the inertia estimation result is affected by many factors as shown in Table I, and the accuracy of the comparison schemes (Scheme-I and Scheme-II) cannot be entirely consistent with the existing research papers. However, considering that the estimation accuracy of Scheme-I is high enough, the accuracy of the proposed inertia parameter identification method can be verified. The correctness of the proposed rotor speed calculation method can be verified by the significant improvement in estimation accuracy of the proposed method over Scheme-II, as well as the low error of rotor speed calculation results in Table III.

3) The Effect of Disturbance Location: The inertia estimation method is also verified when the load disturbance location is far from the POIs, i.e., {03, 04, 05, 13, 14, 16, 17, 18, 26, 27} in FIG. 6. The indexes for rotor speed calculation and inertia estimation are shown in Table V. The closer the disturbance is to the topology center of the power system, the weaker the frequency spatial difference is, and the POI frequency is closer to the rotor speed behind it. It should be noted that the parameter identification method is not affected by the disturbance location. As a result, the inertia estimation accuracy is higher than that in Table II for both Scheme-II and the proposed scheme.

TABLE V

The indexes when the load disturbance location is far from the POIs

| Scheme | $f_{E, avg}$ (10$^{-5}$ Hz) | $H_{C, avg}$ (%) | $H_{M, avg}$ (%) | $H_{P, avg}$ (%) |
|---|---|---|---|---|
| Scheme-II | 4.59 | 1.81 | 1.73 | 2.44 |
| Proposed | 1.43 | 1.00 | 0.96 | 1.21 |

Figure 9:
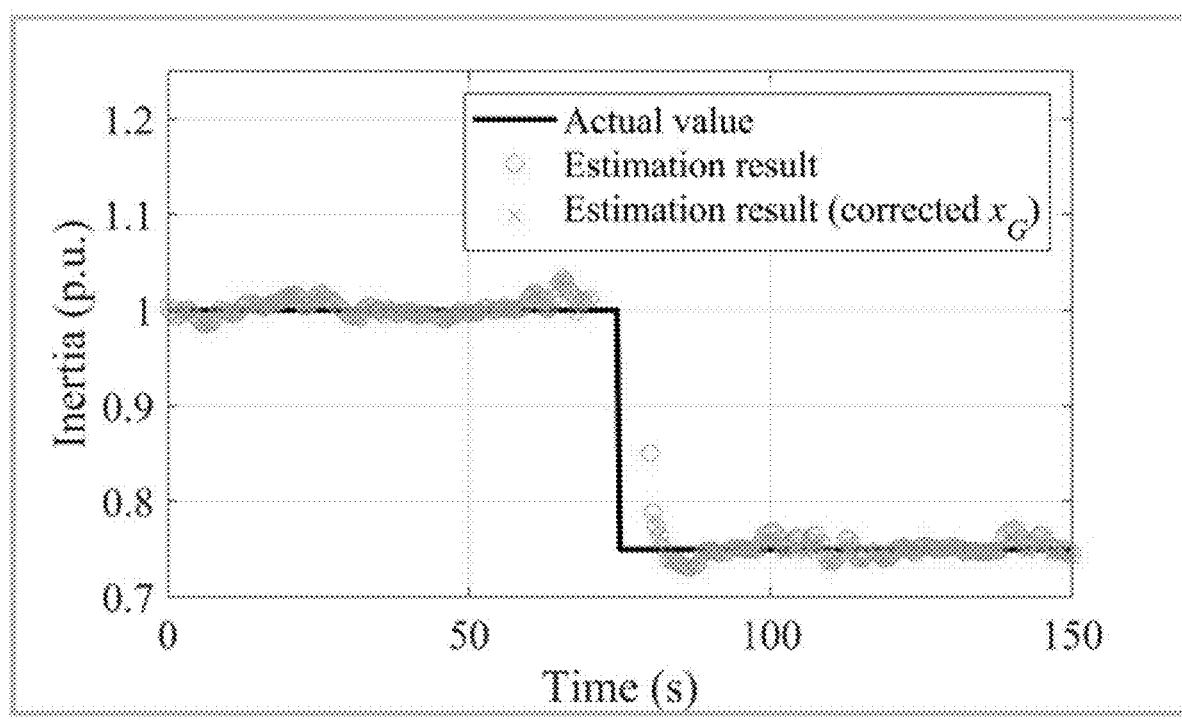
FIG. 9 shows the inertia tracking result of the exemplary embodiment of the present disclosure.

4) *Online Tracking Ability:* In addition to the base-case load disturbance, one generator in aggregated G02 is tripped at t=75 s. According to the parameter setting, the four generators, which are aggregated as G02, have the same inertia constant. Therefore, the true value of the POI-level inertia decreases by 25% afterwards. FIG. 9 shows the inertia tracking result of the exemplary embodiment of the present disclosure. The proposed inertia estimation method can quickly track the real-time aggregated inertia of the POI bus. In fact, the generator trip not only changes the aggregated inertia of the POI bus but also influences the POI-level aggregated transient reactance, which cannot be reflected via SCADA/EMS in a timely manner. Therefore, the inertia online estimation result can be regarded as a generator tripping detection index. The aggregated transient reactance value can then be modified, which would improve the inertia estimation accuracy in return, as shown in FIG. 9.

It should be noted that the equivalent mechanical power of the aggregated generator G02 would suffer from a step change when the generator connected to POI Bus 06 trips. Since the mechanical power is assumed to be constant in (23), the estimation result is not available if the data window contains the trip time.

5) *Computation Burden:* The average solving times for Step 2 and Step 3 as given in Section III-E are 10 milliseconds and 228 milliseconds, respectively, which can be neglected compared to the 10 seconds window length of parameter identification. The simulations are performed on a laptop with Intel(R) Core(TM) i7-8550U CPU@1.80 GHz and 8 GB memory and coded on MATLAB.

C. *Impacts of Different Field Conditions*

In the sequel, the impacts of different field conditions on the proposed approach would be tested, including redundant PMU placement, the lack of POI frequency measurement, the error of generator transient reactance, the error of line parameter and topology, and the RPG penetration.

1) *Redundant PMU Placement:* White noise with a level of 0.05 mHz is added to the measurement data of all network buses. Since the derivation range of frequency is less than 3 mHz, this noise level is high enough. As shown in Table VI, when there is no redundant measurement, i.e., $S_{fP,min}$, the rotor speed calculation error increases significantly compared with Section IV-B. Since (19) represents a linear superposition correlation, the noise in the frequency measurement will be delivered and magnified in the rotor speed calculation results. Although the parameter identification method is robust to noise, the accuracy of the estimated inertia still decreases.

TABLE VI

The evaluation indexes with redundant PMU Placement

| PMU Placement | $f_{E, avg}$ (10$^{-5}$ Hz) | $H_{C, avg}$ (%) | $H_{M, avg}$ (%) | $H_{P, avg}$ (%) |
|---|---|---|---|---|
| $S_{fP, min}$ | 28.92 | 1.78 | 1.26 | 2.28 |
| $S_{fP, min}$ and 10 more | 25.30 | 1.67 | 1.27 | 2.16 |
| $S_{fP, min}$ and 20 more | 24.05 | 1.64 | 1.25 | 2.08 |

In this regard, 10 and 20 more PMUs are installed at random buses in addition to the POI-level ones. The least squares solution of (21) is calculated, where the weighting factor of each bus is set to 1. As shown in Table VI, the accuracy of the rotor speed calculation and inertia estimation can be improved, which means that redundant PMU placement can improve the accuracy of the proposed method in a noisy environment.

Furthermore, extreme noise and bad data are added to the PMU installed at Bus 06. One redundant PMU is placed beside the minimum set of PMUs, i.e., $S_{fP,min}$. As given in Table VII, when the weighting factor of Bus 06 is equal to 1 (the same as other buses), the errors in the frequency calculation and inertia estimation are large. The errors are significantly reduced by online reduction of the weighting factor of Bus 06 to 10$^{-5}$ or 10$^{-7}$.

TABLE VII

The evaluation indexes with adjusting weighting factor of Bus 06

| Weighting Factor of Bus 06 | $f_{E, avg}$ (10$^{-5}$ Hz) | $H_{C, avg}$ (%) | $H_{M, avg}$ (%) | $H_{P, avg}$ (%) |
|---|---|---|---|---|
| $w_6 = 1$ p.u. | 14.54 | 1.49 | 1.22 | 1.91 |
| $w_6 = 10^{-5}$ p.u. | 2.82 | 1.36 | 1.15 | 1.82 |
| $w_6 = 10^{-7}$ p.u. | 2.40 | 1.30 | 1.25 | 1.61 |

2) *Lack of POI Frequency Measurement:* The POI Bus 06 of generator G02 has no frequency measurement. According to the Constraints in Section III-B, the frequency measurement of Bus 05 or Bus 27 can be substituted for Bus 06. The frequency calculation error under the adjusted PMU combination in Table VIII is similar to that in Table IV, which suggests the correctness of the proposed Constraints and (19). The slight difference is due to neglecting the resistance in the Frequency Divider (5), where the resistance of each line is different. In addition, the active power of Bus 06 is still used, and the inertia estimation evaluation index remains unchanged.

TABLE VIII

The evaluation indexes with lack of POI frequency measurement

| Substitute Measurement | $f_{E, avg}$ (10$^{-5}$ Hz) | $H_{C, avg}$ (%) | $H_{M, avg}$ (%) | $H_{P, avg}$ (%) |
|---|---|---|---|---|
| Bus 05 | 2.43 | 1.63 | 1.61 | 1.98 |
| Bus 27 | 2.64 | 1.39 | 1.26 | 1.80 |

3) *The Error of the Generator Transient Reactance:* Errors may exist in the generator transient reactance due to the inherent defects in the SCADA/EMS system. This error will lead to inaccurate rotor speed calculations and will further affect the accuracy of the inertia estimation. As a typical scenario, the transient reactance error caused by a generator trip is discussed in Section IV-B. Furthermore, let us consider the random error added at all generator transient reactance values, with levels of [0-30%] and [0-50%] for each generator. The evaluation indexes are shown in Table IX. Even when the maximum error reaches 50%, the speed calculation results are still better than those obtained directly using the POI frequency ($f_{E,avg}$=9.73×10$^{-5}$ Hz in Table III). The inertia estimation results are still accurate.

TABLE IX

The evaluation indexes with errors in the generator transient reactance

| Error Level in Transient Reactance | $f_{E,\ avg}$ (10$^{-5}$ Hz) | $H_{C,\ avg}$ (%) | $H_{M,\ avg}$ (%) | $H_{P,\ avg}$ (%) |
|---|---|---|---|---|
| 0 | 2.41 | 1.30 | 1.25 | 1.61 |
| [0-30%] | 3.01 | 1.36 | 1.21 | 1.89 |
| [0-50%] | 3.46 | 1.83 | 1.79 | 2.38 |

4) *The Error of Line Parameter and Topology:* Due to the inherent defects in the SCADA/EMS system, there could be errors in either transmission line parameters or the system topology. The parameter error is simulated by adding random error to the reactance of all lines with levels of [0-30%] and [0-50%]. The topology error is simulated by random disconnection of transmission lines (this event is not updated in SCADA/EMS), considering the N-1 and N-2 scenarios. The error indexes are given in Tables X and XI. It can be seen that the proposed method is robust to line parameter and topology error. The largest estimation error exists in the case with N-2 topology change, which is still acceptable.

TABLE X

The evaluation indexes in the presence of error in line parameter

| Error Level in Line Reactance | $f_{E,\ avg}$ (10$^{-5}$ Hz) | $H_{C,\ avg}$ (%) | $H_{M,\ avg}$ (%) | $H_{P,\ avg}$ (%) |
|---|---|---|---|---|
| 0 | 2.41 | 1.30 | 1.25 | 1.61 |
| [0-30%] | 3.32 | 1.63 | 1.53 | 2.09 |
| [0-50%] | 3.50 | 1.81 | 1.73 | 2.48 |

TABLE XI

The evaluation indexes in the presence of error in topology

| | Line Disconnection | $f_{E,\ avg}$ (10$^{-5}$ Hz) | $H_{C,\ avg}$ (%) | $H_{M,\ avg}$ (%) | $H_{P,\ avg}$ (%) |
|---|---|---|---|---|---|
| | None | 2.41 | 1.30 | 1.25 | 1.61 |
| N-1 | Line 04-05 | 3.20 | 1.72 | 1.43 | 2.27 |
| | Line 26-29 | 2.94 | 1.64 | 1.63 | 2.10 |
| | Line 15-16 | 3.27 | 1.65 | 1.55 | 2.03 |
| N-2 | Line 04-05 & 26-29 | 4.09 | 2.12 | 1.81 | 3.19 |
| | Line 26-29 & 15-16 | 3.64 | 1.87 | 1.82 | 2.33 |
| | Line 04-05 & 15-16 | 4.65 | 2.41 | 2.31 | 3.08 |

5) *RPG Penetration:* The RPG high penetration scenario is simulated by adding a large number of Type-3 wind generators in the modified IEEE 39-bus System, with all the POI buses being connected to 6 MW×40 wind generators. The VI is not activated during ambient load variation, and the total inertia of the power system remains unchanged. Moreover, due to the fast control of power electronics, the inherent rotating inertia of wind turbine cannot be reflected externally and is not considered. The RPG penetration rate is defined as the ratio of the RPG active power output to the system total active power, as follows:

$$pen_t\% = \frac{\sum_{i=1}^{M} P_{w,i}}{\sum_{i=1}^{M} P_{T,i} + \sum_{i=1}^{M} P_{w,i}}, \forall t \quad (25)$$

where $P_{W,i}$ and $P_{T,i}$ are the real-time active power of the wind generator and synchronous generator, respectively. The output active power of the wind generator fluctuates in the dynamics, and the amplitude of fluctuation is approximately 0.14% of the load disturbance power. The error indexes with pen %=40% are shown in Table XII. The accuracy of the speed calculation and inertia estimation are degraded but still within the acceptable range, indicating the applicability of the proposed approach under high-level RPG penetration conditions.

TABLE XII

The evaluation indexes with RPG penetration

| $f_{E,\ avg}$(10$^{-5}$ Hz) | $H_{C,\ avg}$(%) | $H_{M,\ avg}$(%) | $H_{P,\ avg}$(%) |
|---|---|---|---|
| 3.28 | 1.67 | 1.62 | 2.21 |

V. Conclusion

This disclosure describes an exemplary method to estimate the POI-level aggregated inertia. Considering that the contribution of VI to the power system inertia is relatively small at this stage, this paper focuses on the inertia provided by synchronous generators. To calculate the generator rotor speed by bus frequency measurement, the power system frequency spatial correlation is discussed in detail, and the general correlation between the rotor speed and network bus frequency is given. Then, the PMU placement principle for inertia estimation is derived, and the weighted least squares problem reformulation with redundant PMU measurement is proposed. The lack of POI frequency measurement is also discussed. Furthermore, the system-level inertia identification method is established, which can be applied in small disturbance scenarios, and in which the measurement of the mechanical power is not required. The geographic distribution of system-level inertia can be depicted based on accurate estimation of POI-level inertia.

The effectiveness of the proposed method is demonstrated through theoretical analysis and IEEE 39-bus System simulation. The proposed method can track the POI-level inertia in real time using ambient measurements. Data quality issues can be avoided by adjusting weight factors online. The adjusted PMU combination can be chosen when POI frequency measurement is lacking. The errors in the generator transient reactance, transmission line reactance, and system topology have little influence on the estimation results. Furthermore, the proposed method can be applied in scenarios with high penetration of RPGs.

Technical Implementation of the Exemplary System

Figure 10:
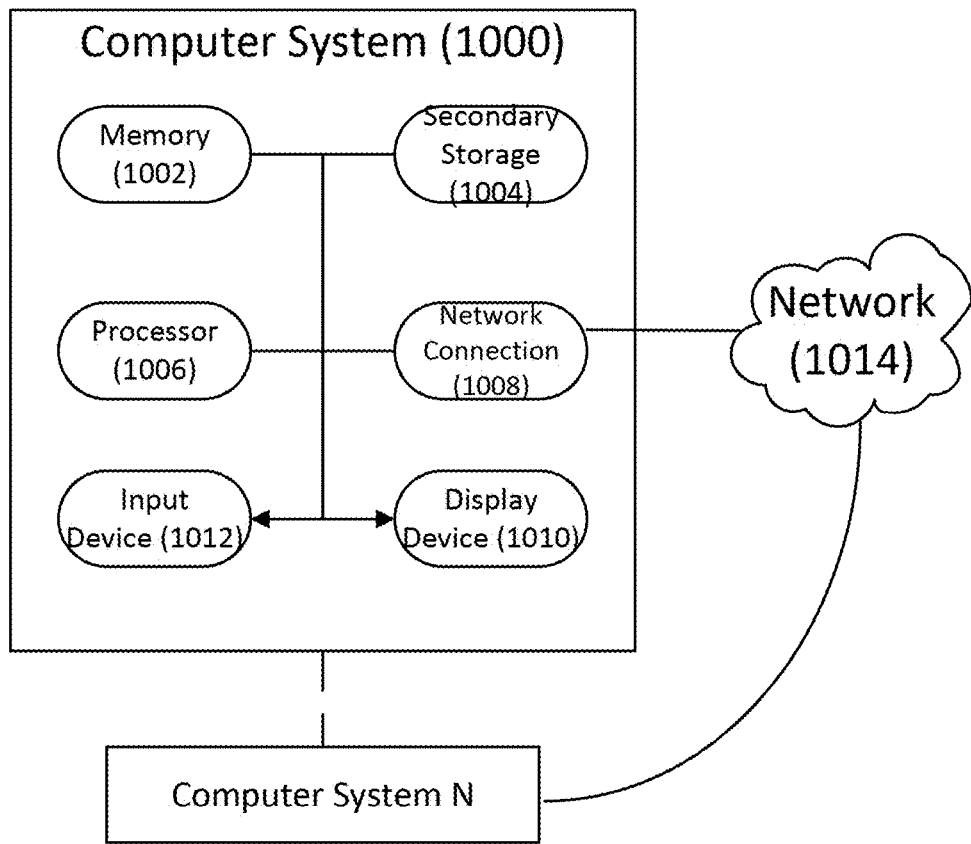
FIG. 10 illustrates exemplary hardware components for a system according to an example embodiment of the present disclosure.

FIG. 10 illustrates exemplary hardware components of an exemplary system. A computer system 1000, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 1000, may run an application (or software) and perform the steps and functionalities described above. Computer system 1000 may connect to a network 1014, e.g., Internet, or other network, to receive inquiries, obtain data, and transmit information and incentives as described above.

The computer system 1000 typically includes a memory 1002, a secondary storage device 1004, and a processor 1006. The computer system 1000 may also include a plurality of processors 1006 and be configured as a plurality of, e.g., bladed servers, or other known server configurations. The computer system 1000 may also include a network connection device 1008, a display device 1010, and an input device 1012.

The memory 1002 may include RAM or similar types of memory, and it may store one or more applications for execution by processor 1006. Secondary storage device 1004 may include a hard disk drive, floppy disk drive, CD-ROM drive, or other types of non-volatile data storage. Processor 1006 executes the application(s), such as those described herein, which are stored in memory 1002 or secondary storage 1004, or received from the Internet or other network 1014. The processing by processor 1006 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 1000 may store one or more database structures in the secondary storage 1004, for example, for storing and maintaining the information necessary to perform the above-described functions. Alternatively, such information may be in storage devices separate from these components.

Also, as noted, processor 1006 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 1000.

The input device 1012 may include any device for entering information into the computer system 1000, such as a touch-screen, keyboard, mouse, cursor-control device, microphone, digital camera, video recorder or camcorder. The input and output device 1012 may be used to enter information into GUIs during performance of the methods described above. The display device 1010 may include any type of device for presenting visual information such as, for example, a computer monitor or flat-screen display (or mobile device screen). The display device 1010 may display the GUIs and/or output from sub-system components (or software).

Examples of the computer system 1000 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1000 is shown in detail, system 1000 may use multiple computer systems or servers as necessary or desired to support the users and may also use back-up or redundant servers to prevent network downtime in the event of a failure of a particular server. In addition, although computer system 1000 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1000, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

APPENDIX

Similar to (7), the network buses in (6) can be divided into POI buses and non-POI buses as follows:

$$\Delta f_G = -\begin{bmatrix} \text{diag}(b_{GB}) \\ 0_{N \times M} \end{bmatrix}^+ \begin{bmatrix} B_{DB} \\ B_{DL} \end{bmatrix} \Delta f_D, \quad (A.1)$$

The Moore Penrose inverse can be written as $$\Delta f_G = -\left( [\text{diag}(b_{GB})^T 0_{M \times N}] \begin{bmatrix} \text{diag}(b_{GB}) \\ 0_{N \times M} \end{bmatrix} \right)^{-1} \quad (A.2)$$

$$[\text{diag}(b_{GB})^T 0_{M \times N}] \begin{bmatrix} B_{DB} \\ B_{DL} \end{bmatrix} \Delta f_D,$$

Since $\text{diag}(b_{GB})$ is the diagonal matrix, $\text{diag}(b_{GB}) = \text{diag}(b_{GB})^T$ $$\Delta f_G = -[\text{diag}(b_{GB})^{-1} 0_{M \times N}] \begin{bmatrix} B_{DB} \\ B_{DL} \end{bmatrix} \Delta f_D = -\text{diag}(b_{GB})^{-1} B_{DB} \Delta f_D, \quad (A.3)$$

which is identical to (8).

What is claimed is:
1. A method for maintaining power system stability comprising:
   collecting system topology data, reactance values and resistance values of transmission lines from an SCADA/EMS system;

collecting frequency and active power samples from phaser measurement units (PMU) installed at point of interconnection (POI) buses;

calculating active power $\hat{P}_T$ at an POI-level aggregated generator terminal and the rotor speed $\hat{f}_G$ of the POI-level aggregated generator according to the following:

$$\Delta \hat{f}_G = \text{diag}(b_{GB})^{-1} B_{DB} \begin{bmatrix} E \\ B_{DL} \end{bmatrix}^+ \begin{bmatrix} \Lambda_L \\ 0_{N \times L} \end{bmatrix} \Delta f_{D,me} = A \Delta f_{D,me} \quad (19)$$

whereas $S_{f,min} = \Delta f_{D,me}^{(1)} \cap \ldots \cap \Delta f_{D,me}^{(i)} \cap \ldots \cap \Delta f_{D,me}^{(M)} = \Delta f_{D,me}^{(POI)}$;

whereas calculation of $\Delta \hat{f}_D$ is the following weighted least squares problem:

$$\min_{\Delta \hat{f}_D} e^T W e \quad (20a)$$

$$e = \begin{bmatrix} \Lambda_L \\ 0_{N \times L} \end{bmatrix} \Delta f_{D,me} + \begin{bmatrix} -E \\ B_{DL} \end{bmatrix} \Delta \hat{f}_D, \quad (20b)$$

where $W \in \mathbb{R}^{(L+N) \times (L+N)}$ denotes a diagonal matrix related to the measured frequency data quality at each measured point;

where $A \in \mathbb{R}^{M \times M}$ is a linear correlation between rotor speeds and POI bus frequencies;

$$\hat{P}_T = P_{B,me} + \text{diag}(r) I_{B,me}^2, \quad (22)$$

where $I_{B,me} \in \mathbb{R}^{M \times 1}$ and $P_{B,me} \in \mathbb{R}^{M \times 1}$ are the current and active power of the incoming line measured by the POI-bus PMU, respectively, and $\text{diag}(r) \in \mathbb{R}^{M \times M}$ is a diagonal matrix; and where PMUs are placed at all POI buses for active power measurement such that $$S_P = P_{B,me}^{(POI)},$$

and that $S_{fP,min} = S_{f,min} \cap S_P$;

if the frequency of POI PMU is not available, adopting (19) under an adjusted PMU combination;

if the non-POI PMUs data are available, calculating the following and obtaining the weighted-least-squares solution $\hat{f}_{G,W}$:

$$\Delta \hat{f}_{G,W} = \text{diag}(b_{GB})^{-1} B_{DB} \begin{bmatrix} E \\ B_{DL} \end{bmatrix}_W^+ \begin{bmatrix} \Lambda_L \\ 0_{N \times L} \end{bmatrix} \Delta f_{D,me} = A_W \Delta f_{D,me}, \quad (21)$$

estimating POI-level aggregated inertia by solving the following for each POI bus:

$$2\hat{H}_{ag} p y(t) = \Delta \hat{P}_m u_1(t) + u_2(t), \quad (23a)$$

$$\bar{y} = \{0, \hat{f}_G(t_2) - \hat{f}_G(t_1), \hat{f}_3(t_3) - \hat{f}_G(t_1), \ldots, \hat{f}_G(t_K) - \hat{f}_G(t_1)\}, \quad (23b)$$

$$\bar{u}_1 = \{1,1,1,\ldots,1\}, \quad (23c)$$

$$\bar{u}_2 = \{0, -\hat{P}_T(t_2) + \hat{P}_T(t_1), -\hat{P}_T(t_3) + \hat{P}_T(t_1), \ldots, -\hat{P}_T(t_K) + \hat{P}_T(t_1)\}. \quad (23d)$$

in which $\{\hat{H}_{ag}, \Delta \hat{P}_m\}$ is the parameter vector to be identified; y(t) and $u_2$(t) are the values of rotor speed and active power deviation from the operating point, respectively; and $u_1$ (t) represents the mechanical power and remains constant;

estimating the system-level inertia by:

$$\hat{H}_{sys,t} = \frac{\sum_i \hat{H}_{ag,i} S_{ag,i}}{\sum_i S_{ag,i}}, \forall t, \quad (24)$$

where $\hat{H}_{ag,i}$ and $S_{ag,i}$ are the POI-level aggregated inertia constant and rated capacity of generator i, respectively;

estimating frequency stability indexes including post-disturbance rate of change of frequency (RoCoF) and frequency nadir based on the system-level inertia;

determine whether the frequency stability indexes reach a predetermined limitation;

when the predetermined limitation is reached, activate at least one generator to increase system inertia.

* * * * *